United States Patent [19]

Berlin et al.

[11] Patent Number: 6,006,199
[45] Date of Patent: Dec. 21, 1999

[54] METHOD AND SYSTEM FOR AUTOMATED PAYMENT WITHIN A COMPUTER INTEGRATED MANUFACTURING SYSTEM

[75] Inventors: Robert L. Berlin, Mableton, Ga.; Craig Alfred Bloszinsky, Matthews, N.C.; William Edwin Bruner; Francis Lionel Fitzpatrick, both of Austin, Tex.; Joseph Edward Hein, San Jose, Calif.; Donald Roy Johnson, Austin, Tex.; Barry Edmund McCaa; Bharath Natarajan, both of Marietta, Ga.

[73] Assignee: International Business Machines Corporation, Armonk, N.Y.

[21] Appl. No.: 07/815,654

[22] Filed: Dec. 31, 1991

[51] Int. Cl.⁶ .......................................... G06F 15/21
[52] U.S. Cl. .............................................. 705/26
[58] Field of Search .................................. 364/408, 401, 364/406, 468

[56] References Cited

U.S. PATENT DOCUMENTS

| | | |
|---|---|---|
| 4,567,359 | 1/1986 | Lockwood . |
| 4,594,663 | 6/1986 | Nagata et al. . |
| 4,713,761 | 12/1987 | Sharpe et al. . |
| 4,799,156 | 1/1989 | Shavit et al. ............................. 364/401 |
| 4,887,218 | 12/1989 | Natarajan . |
| 4,897,867 | 1/1990 | Foster et al. . |
| 4,951,196 | 8/1990 | Jackson ................................... 364/401 |
| 5,101,352 | 3/1992 | Rembert .................................. 364/401 |
| 5,237,495 | 8/1993 | Morii ...................................... 364/401 |
| 5,315,508 | 5/1994 | Bain et al. ............................... 364/401 |

OTHER PUBLICATIONS

"Bill Payment Transfer System" by D.F. Earley, D. Royse, and J. Svigals, IBM Technical Disclosure Bulletin, vol. 19, No. 5, Oct. 1976, p. 1917.

Primary Examiner—P. R. Myers
Attorney, Agent, or Firm—Stephen C. Kaufman; Andrew J. Dillon

[57] ABSTRACT

A method and system are provided for automating validation and payment within a Computer Integrated Manufacturing (CIM) system having a number of trading partners linked via an independent (or proprietary) communications network utilizing an Electronic Data Interchange (EDI). Planned orders for production items generated via a Materials Requirement Planning (MRP) system and/or orders for non-production items are utilized by a purchasing system to create a purchase order which is then transmitted to a supplier via Electronic Data Interchange (EDI). A planned receipt list of items is created based upon the purchase order and utilized to validate those items listed within an advanced ship notice. In response to such validation, or after correcting any discrepancy in accordance with listed tolerances, an authorization for payment is automatically generated and payment is issued. In one embodiment of the present invention, an electronic funds transfer request is automatically sent to a financial institution authorizing a fund transfer. Preferably, the terms of payment for each purchase are listed within an associated purchase order and an authorization for payment which is automatically issued will comply with such listed terms, ensuring that available discounts are utilized.

12 Claims, 3 Drawing Sheets

METHOD AND SYSTEM FOR AUTOMATED PAYMENT WITHIN A COMPUTER INTEGRATED MANUFACTURING SYSTEM

BACKGROUND OF THE INVENTION

1. Technical Field

The present invention relates in general to the field of Computer Integrated Manufacturing (CIM) systems and in particular to improvements in payment procedures within Computer Integrated Manufacturing (CIM) systems. Still more particularly, the present invention relates to methods and systems for automating payment in a Computer Integrated Manufacturing (CIM) system wherein a significant savings over manual payment processing systems may be obtained.

2. Description of the Related Art

Computer Integrated Manufacturing (CIM) systems utilize computers to bridge and connect various computerized systems into a coherent, integrated whole, whereby the manufacturing process may be rendered more efficient.

The problem of production management within a Computer Integrated Manufacturing (CIM) system has been documented within many papers and books. For example, Joseph Orlicky wrote *Material Requirements Planning*, published by McGraw-Hill, which has become the industry standard reference for almost all job shop planning requirements. This concept of planning and releasing is well accepted and, even today, many vendors are selling software based upon this concept. A Purchasing System coupled to a Material Requirements Planning System may be utilized to automatically generate a purchase order for required materials.

Requisition grouping and order creation within a Computer Integrated Manufacturing (CIM) system may also be performed utilizing the Communications Oriented Production Inventory Control System (COPICS) distributed by International Business Machines Corporation. The COPICS system performs the requisition grouping process and order creation prior to transmitting an order to a supplier. The supplier then receives an order for an item via an electronic data interchange (EDI) along with a series of delivery schedules and quantities. At some date prior to the actual scheduled delivery date, the supplier sends an EDI advanced ship notice to the ordering enterprise. When the actual delivery is made, it is typically accompanied by a packing slip which contains information which is duplicated by that which was sent within the advanced ship notice. Quantities within an order are then checked for accuracy and the order delivery is considered complete.

Traditionally, the receipt of goods is thereafter manually entered into a system, based upon the packing slip information which is provided by the supplier. This information is added to the purchasing system for review by the requester, buyer, and accounts payable personnel. An invoice is then sent by the supplier to the purchasing enterprise for payment. In many cases the payment location is not the same as the ordering location, which adds to the complexity of ensuring accuracy in a delivery and payment system. Accounting must also verify the quantity and quality of goods received and make payment. When the goods received do not match, the goods which are invoiced an invoice referral is generally sent to the buyer for corrective action. This process is often performed prior to payment which can conceivably reduce the opportunity of the purchaser to obtain discounts. For example, if the commercial payment terms are 2%/10 net 30, a discount of 2% would be lost if the referral resolution takes longer than ten days. Alternatively, if payment is made upon receipt to the supplier errors in shipment must be handled after payment has been made.

It should therefore be apparent that a need exists for an automated method and system for payment within a Computer Integrated Manufacturing (CIM) system which will reduce the chances of making an inaccurate or premature payment while allowing the aggregation of invoices to make a minimum number of financial transaction per supplier and improving the timeliness of payments to take advantage of discounts, maximizing the use of funds by an enterprise.

SUMMARY OF THE INVENTION

It is therefore one object of the present invention to provide an improved Computer Integrated Manufacturing (CIM) system.

It is another object of the present invention to provide an improved method and system for automating validation and payment for materials received within a Computer Integrated Manufacturing (CIM) system.

It is yet another object of the present invention to provide an improved method and system for automating validation and payment for materials received in a Computer Integrated Manufacturing (CIM) system wherein a significant savings over manual invoice processing systems may be obtained.

The foregoing objects are achieved as is now described. A method and system are provided for automating validation and payment within a Computer Integrated Manufacturing (CIM) system having a number of trading partners linked via an independent (or proprietary) communications network utilizing an Electronic Data Interchange (EDI). Planned orders for production items generated via a Materials Requirement Planning (MRP) system and/or orders for non-production items are utilized by a purchasing system to create a purchase order which is then transmitted to a supplier via Electronic Data Interchange (EDI). A planned receipt list of items is created based upon the purchase order and utilized to validate those items listed within an advanced ship notice. In response to such validation, or after correcting any discrepancy in accordance with listed tolerances, an authorization for payment is automatically generated and payment is issued. In one embodiment of the present invention, an electronic funds transfer request is automatically sent to a financial institution authorizing a fund transfer. Preferably, the terms of payment for each purchase are listed within an associated purchase order and an authorization for payment which is automatically issued will comply with such listed terms, ensuring that available discounts are utilized.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
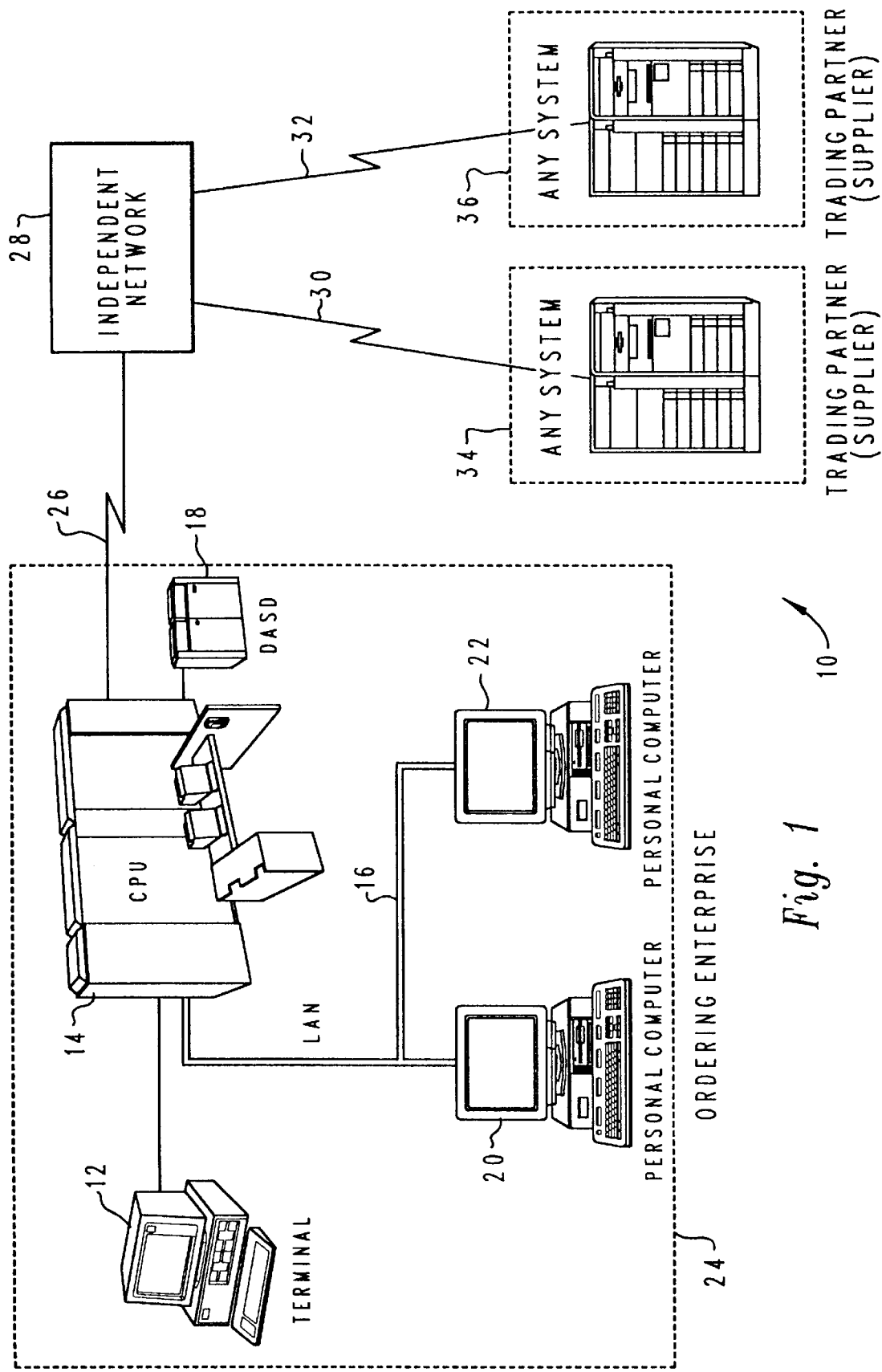
FIG. 1 depicts a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention.

As may be seen in the example depicted, data processing system 10 includes a terminal 12 which is attached to a Central Processing Unit (CPU) 14. Central Processing Unit (CPU) 14 includes attached disk storage 18 and additional personal computers 20 and 22 may be attached to Central Processing Unit (CPU) 14 by means of Local Area Network (LAN) 16, in a manner well known in the art. Those skilled in the art will appreciate that personal computers 20 and 22 may include additional disk storage devices, or may share disk storage device 18. As depicted, a communications link 26 is provided and serves to link Central Processing Unit (CPU) 14 with independent network 28. Independent network 28 preferably is utilized to facilitate Electronic Data Interchange (EDI) communications with various trading partners 34 and 36 via communication links 30 and 32 in the manner depicted.

While data processing system 10 depicted within FIG. 1 is a possible configuration which may be utilized to implement the method and system of the present invention those skilled in the art will appreciate that ordering enterprise 24 may be implemented utilizing a single so-called personal computer, or may be implemented utilizing multiple central processing units which are linked in a vast array with a large multitude of connecting internal networks and Local Area Networks, each including terminals, personal computers, and other such devices. It is contemplated that such a complex environment may possibly span entire divisions and multiple manufacturing locations of a single large enterprise or corporation.

As those skilled in the art will appreciate, it is often desirable for an ordering enterprise, such as ordering enterprise 24 to communicate a purchase order to a trading partner, such as trading partner 34 or 36. Various standards for Electronic Data Interchange (EDI) exists which permit business data, such as purchase orders or advanced shipment notices, to be interchanged throughout a data processing network in a previously agreed upon format. Many well known data interchange standards, such as the American National Standards Institute (ANSI) X12 or United Nations (UN) EDIFACT standards exist and may be utilized to permit such business data to be interchanged by trading partners throughout data processing network 10.

By the term "trading partners" what is meant is a group of entities which are not related to ordering enterprise 24, with whom the interchange of formatted business data is desired.

By establishing an Electronic Data Interchange (EDI) system in the manner depicted within FIG. 1, the following scenario is essentially enabled. A Material Requirements Planning (MRP) system may be coupled to a Purchasing System within Central Processing Unit (CPU) 14 in order to efficiently and electronically create purchase orders. Such purchase orders would describe items required by a first trading partner, such as ordering enterprise 24, to be purchased from a second trading partner, such as trading partner 34. The purchase order created in this manner would be transformed to a set of data which conforms to an agreed upon standard format, such as ANSI X12 850 Purchase Order prior to being transmitted from Central Processing Unit (CPU) 14 within ordering enterprise 24 through communications link 26 to independent network 28. The desired trading partner would then receive the purchase order from independent network 28 and possibly transform the data into a different format to be utilized in a local computer system.

Figure 2A:
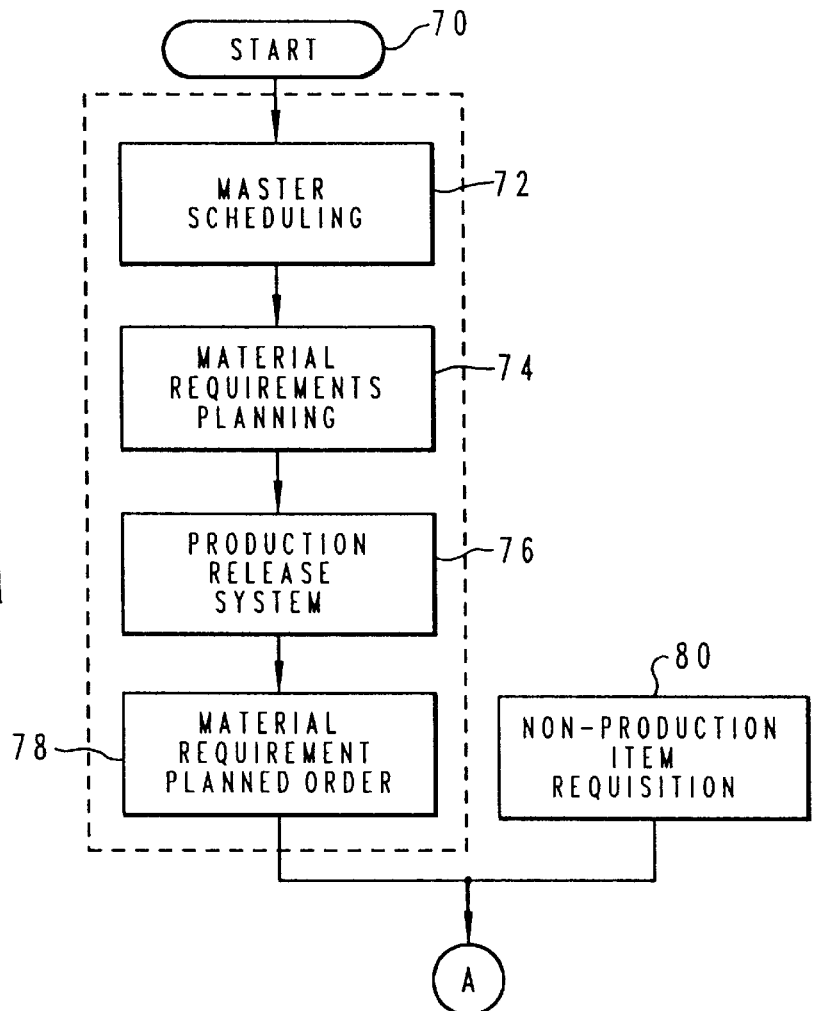
FIGS. 2a–2c comprise a high level flowchart illustrating the method of automatically authorizing payment within a Computer Integrated Manufacturing (CIM) system in accordance with the method and system of the present invention.
Figure 2C:
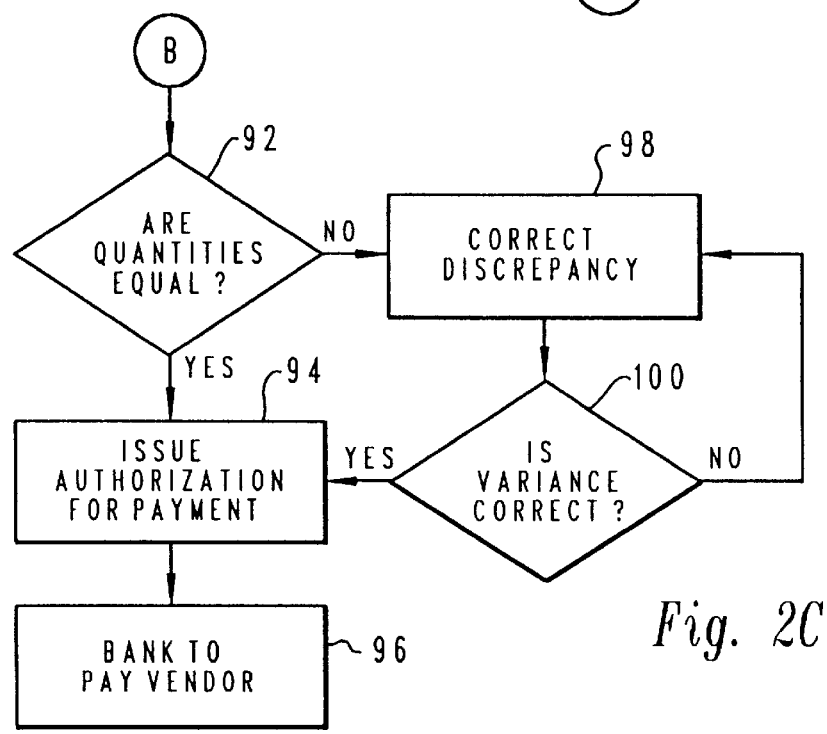
Figure 2B:
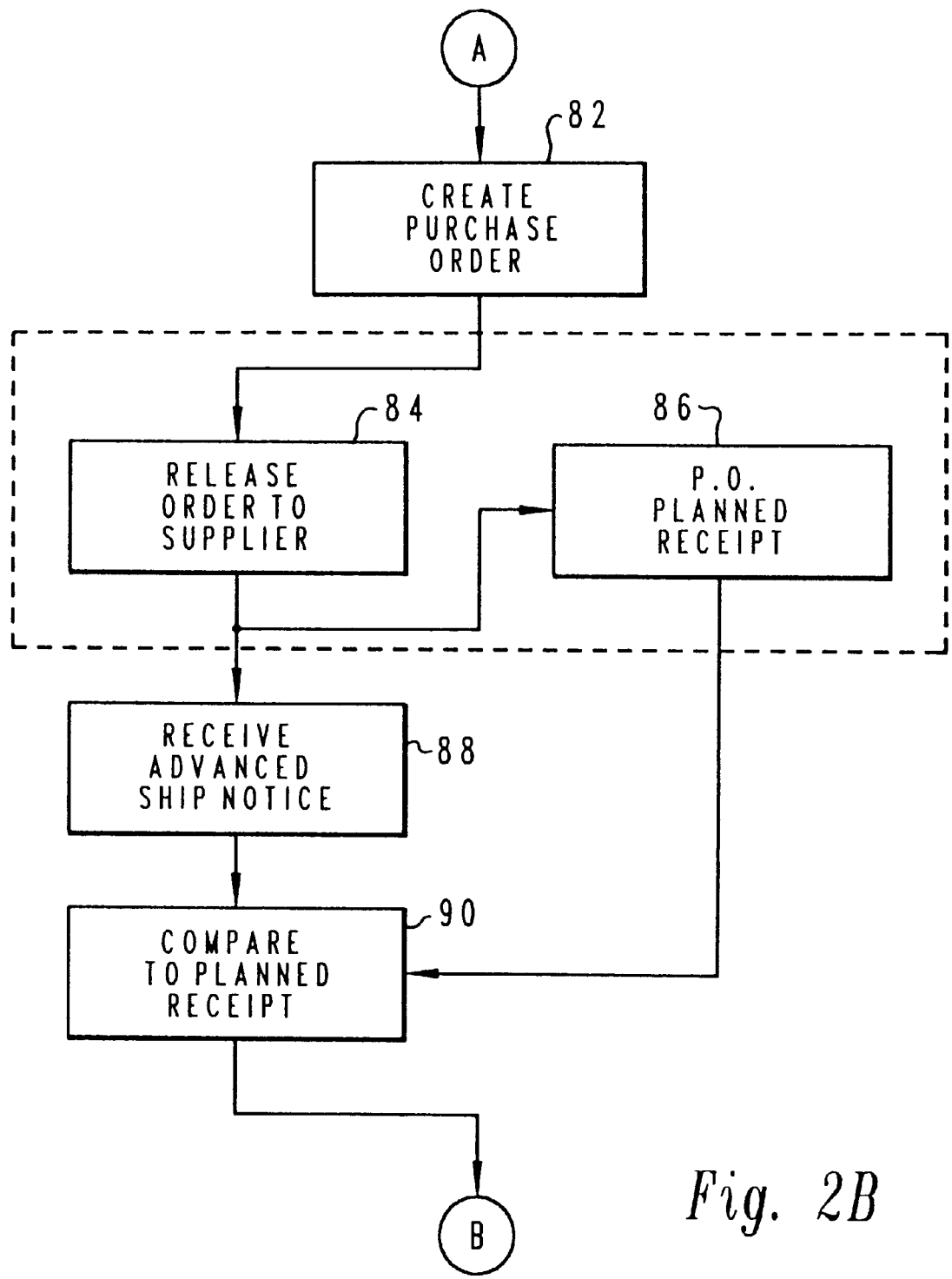

Referring now to FIGS. 2a–2c, there is depicted a high level flowchart which illustrates a method and system of automatically authorizing payment within a Computer Integrated Manufacturing (CIM) system, in accordance with the method and system of the present invention. As illustrated, the process begins at block 70 and thereafter passes through blocks 72, 74, 76 and 78, which illustrate the generation of planned orders for both purchased and manufactured production items. Master scheduling block 72 is utilized in conjunction with materials requirement planning block 74 and the production release system block 76 to group requisitions and create a planned order utilizing any well known material requirement planning system, as depicted at block 78. Of course, those skilled in the art will appreciate that non-production requisitions may also result in the creation of a purchase order. Non-production requisitions are typically created as a result of items required by research and development, quality control or other non-manufacturing entities within an enterprise.

With reference now to FIG. 2b, after grouping requisitions and creating an order for purchased and manufactured production items, as well as non-production requisitions, a purchase order may be created electronically, as depicted within block 82. Next, the electronically created purchase order is released to a designated supplier, as illustrated within block 84. In accordance with an important feature of the present invention, the releasing of a purchase order to a designated supplier, as illustrated within block 84, is followed by the creation of a purchase order planned receipt list, as depicted at block 86. The purchase order planned receipt list created within block 86 is utilized to list those items which are expected in response to open purchase orders, including the indicated delivery date for such orders and the agreed upon payment terms.

Next, the process passes to block 88 which depicts the receipt of an advanced ship notice from a supplier in response to a purchase order. As noted above, the advanced ship notice will indicate all of the quantities of each item which are to be shipped on an indicated delivery date. The process then passes to block 90 which depicts a comparison or validation of those items listed within the advanced ship notice with those items listed within the purchase order planned receipt list created as illustrated at block 86. In this manner an electronic comparison may be made between those items for which receipt is expected to those items which are actually shipped.

The process then passes to block 92 which depicts a determination of whether or not the quantities of items listed within the advanced ship list are equal to the quantities listed within the purchase order planned receipt list created at block 86. In the event the quantities are equal, the process then passes to block 94 which illustrates the automatic issuing of an authorization for payment. Such automatic authorization may take the form of an electronic funds transfer request or other suitable electronic payment authorization techniques.

Thereafter, an appropriate authorization, or electronic funds transfer request is coupled to the purchasing trading partner's bank, authorizing a fund transfer for the amount owed in accordance with the payment terms listed within the purchase order. Such purchase orders typically include terms for payment which may authorize a discount upon payment within a specified period of time. In a preferred embodiment of the present invention, the automatic authorization of payment which results from a successful validation of the advanced ship notice list will include authorization to pay in accordance with the payment terms listed within the purchase orders, such that available discounts may be taken.

In addition to automatically issuing an authorization for payment a system created in accordance with the steps depicted within FIGS. 2a–2c will permit transmission of such an authorization to the supplier, referencing the purchase order, such that cross-checking by the supplier may be accomplished in a manner similar to an individual checking a monthly bank statement. Such notification may also carry an authorization number to be utilized by a bank or other financial institution for permitting a transfer of funds. Upon receipt of an appropriate authorization the financial institution designated by the trading partner purchasing the materials will transfer funds from a pre-determined enterprise account to the supplier's pre-determined bank account. Thereafter, upon an indication of a successful funds transfer, the status of a purchase order may be changed to closed. By utilizing the advanced ship notice to validate a previously created purchase order planned receipt list, the necessity of paper invoicing and payment may be effectively eliminated.

Referring again to block 92, in the event the quantities listed within the advanced shipment notice list do not equal the quantities set forth within the purchase order planned receipt list, the process passes to block 98. Block 98 illustrates the correction of discrepancies between these two lists and is typically implemented by the generation of a discrepancy referral and notification to an individual to begin manual investigation. By automatically validating an advanced shipment notice list against a purchase order planned receipt list, correction of possible discrepancies may be rapidly processed, eliminating possible delays and possibly allowing resolution prior to the actual shipment of materials from the supplier.

As depicted at block 100, if the variance is corrected, the process then passes again to block 94 for the automatic issuance of authorization for payment. In the event the variance is not corrected, as determined at block 100, the process returns to block 98 to continue an attempt to correct any discrepancy. Discrepancies which exist between an advanced shipment notice list and a purchase order planned receipt list may be resolved by either refusing the advanced ship notice or forcing receipt of the delivery. Either solution will require an individual investigating the discrepancy to communicate with the vendor for a final resolution of the problem.

Upon reference to the foregoing those skilled in the art will appreciate that the inventors herein have created a system wherein a purchase order which is electronically created utilizing a materials requirement planning system may be utilized to create an associated purchase order planned receipt list which is then stored and thereafter utilized to validate a prospective shipment by comparing items listed therein with items listed within an advanced ship notice list. In the event such validation occurs, an authorization for payment may be automatically issued in accordance with payment terms specified within the purchase order. In this manner the utilization of paper invoices and payment paperwork may be effectively eliminated, greatly enhancing the efficiency of a Computer Integrated Manufacturing (CIM) system.

While the invention has been particularly shown and described with reference to a preferred embodiment, it will be understood by those skilled in the art that various changes in form and detail of the systems depicted may be made therein without departing from the spirit and scope of the invention.

We claim:

1. An automated payment method for utilization within a computer integrated manufacturing system which includes a plurality of trading partners linked via an electronic data interchange system, said method comprising the computer implemented steps of:

creating within said computer integrated manufacturing system a purchase order listing items to be purchased by a first trading partner from a second trading partner;

transmitting within said computer integrated manufacturing system an advanced shipment notice listing hems to be delivered from said second trading partner to said first trading partner in anticipation of a planned shipment of such items in response to said purchase order;

comparing within said computer integrated manufacturing system items listed within said advanced shipment notice with items listed within said purchase order; and automatically authorizing payment in response to a validation of said items listed within said advanced shipment notice.

2. The automated payment method for utilization within a computer integrated manufacturing system according to claim 1, further including the step of creating within said computer integrated manufacturing system a planned receipt list of items to be received in response to said creation of a purchase order.

3. The automated payment method for utilization within a computer integrated manufacturing system according to claim 2, wherein said step of comparing within said computer integrated manufacturing system items listed within said advanced shipment notice with items listed within said purchase order comprises the steps of comparing within said computer integrated manufacturing system items listed within said advanced shipment notice with items listed within said planned receipt list.

4. The automated payment method for utilization within a computer integrated manufacturing system according to claim 1, further including the step of correcting any existing discrepancies noted within said comparison of items listed within said advanced shipment notice with items listed within said purchase order.

5. The automated payment method for utilization within a computer integrated manufacturing system according to claim 1, wherein said step of automatically authorizing payment in response to a validation of said items listed within said advanced shipment notice comprises the step of automatically issuing an electronic funds transfer request in response to said validation.

6. The automated payment method for utilization within a computer integrated manufacturing system according to claim 1, wherein said purchase order includes a listing of payment terms for purchase of said items listed within said purchase order.

7. The automated payment method for utilization within a computer integrated manufacturing system according to claim 6, wherein said step of automatically authorizing payment in response to a validation of said items listed within said advanced shipment notice comprises the step of automatically authorizing payment in accordance with said listed payment terms.

8. A data processing system for automating payment within a computer integrated manufacturing system which includes a plurality of trading partners linked via an electronic data interchange system, said data processing system comprising:

means for creating a purchase order listing items to be purchased by a first trading partner from a second trading partner;

means for transmitting an advanced shipment notice listing items to be delivered from said second trading partner to said first trading partner in anticipation of a planned shipment of such items in response to said purchase order;

means for comparing items listed within said advanced shipment notice with items listed within said purchase order; and means for automatically authorizing payment in response to a validation of said items listed within said advanced shipment notice.

9. The data processing system for automating payment within a computer integrated manufacturing system according to claim 8, further including means for creating a planned receipt list of items to be received in response to said creating of said purchase order.

10. The data processing system for automating payment within a computer integrated manufacturing system according to claim 8, wherein said means for automatically authorizing payment in response to a validation of said items listed within said advanced shipment notice comprises means for automatically issuing an electronic funds transfer request in response to said validation.

11. The data processing system for automating payment within a computer integrated manufacturing system according to claim 8, wherein said purchase order includes a listing of payment terms for purchase of said items listed within said purchase order.

12. The data processing system for automating payment within a computer integrated manufacturing system according to claim 11, wherein said means for automatically authorizing payment in response to a validation of said items listed within said advanced shipment notice comprises means for automatically authorizing payment in accordance with said listed payment terms.

* * * * *